US011900207B2

(12) United States Patent
Iwata et al.

(10) Patent No.: US 11,900,207 B2
(45) Date of Patent: Feb. 13, 2024

(54) SCANNER APPARATUS, HAND SCANNER HOLDER, AND HAND SCANNER HOLDING METHOD

(71) Applicant: NEC Platforms, Ltd., Kawasaki (JP)

(72) Inventors: Akihisa Iwata, Kanagawa (JP); Katsumi Harashima, Kanagawa (JP); Yuta Sasaki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/780,205

(22) PCT Filed: Nov. 13, 2020

(86) PCT No.: PCT/JP2020/042386
§ 371 (c)(1),
(2) Date: May 26, 2022

(87) PCT Pub. No.: WO2021/106618
PCT Pub. Date: Jun. 3, 2021

(65) Prior Publication Data
US 2022/0405494 A1 Dec. 22, 2022

(30) Foreign Application Priority Data
Nov. 28, 2019 (JP) .................................. 2019-215426

(51) Int. Cl.
G06K 7/10 (2006.01)
G06K 7/14 (2006.01)

(52) U.S. Cl.
CPC ....... *G06K 7/10881* (2013.01); *G06K 7/1413* (2013.01); *G06K 2007/10524* (2013.01)

(58) Field of Classification Search
CPC ... G06K 7/10881; G06K 7/1413; G06K 7/109
(Continued)

(56) References Cited

U.S. PATENT DOCUMENTS

2010/0258634 A1* 10/2010 Takahashi .......... G06K 7/10881
235/472.01

FOREIGN PATENT DOCUMENTS

JP H08287177 A * 11/1996
JP H09-091368 A 4/1997
(Continued)

OTHER PUBLICATIONS

International Search Report for PCT Application No. PCT/JP2020/042386, dated Jan. 19, 2021.
(Continued)

*Primary Examiner* — Edwyn Labaze
(74) *Attorney, Agent, or Firm* — Sughrue Mion, PLLC

(57) ABSTRACT

A scanner apparatus (1A) includes: a housing (11); a hand scanner (20); and a hand scanner holder (30) attached to a side of the housing (11) and configured to hold the hand scanner (20), in which the hand scanner holder (30) includes a base part (31) configured to be attached to the side of the housing (11), the base part (31) includes a pair of holding pieces (34a, 34b) opposed to each other with a first interval therebetween, and the pair of holding pieces (34a, 34b) form a holding recess (34) configured to hold a lower part (21a) of a grasping part (21) of the hand scanner (20), which is inserted, from above the pair of the holding pieces (34a, 34b), between the pair of holding pieces (34a, 34b), in a state in which an upper part (21b) of the grasping part (21) protrudes upward.

10 Claims, 16 Drawing Sheets

(58) Field of Classification Search
USPC .......................... 235/462.45, 472.01, 462.43
See application file for complete search history.

(56) References Cited

FOREIGN PATENT DOCUMENTS

| | | |
|---|---|---|
| JP | 2006/246566 A | 9/2006 |
| JP | 2009-116644 A | 5/2009 |
| JP | 2010-009202 A | 1/2010 |
| JP | 2016-071594 A | 5/2016 |
| KR | 102157020 B1 * | 9/2020 ............. G06K 7/109 |

OTHER PUBLICATIONS

Japanese Office Action for JP Application No. 2019-215426 dated Jan. 19, 2021 with English Translation.

* cited by examiner

SCANNER APPARATUS, HAND SCANNER HOLDER, AND HAND SCANNER HOLDING METHOD

This application is a National Stage Entry of PCT/JP2020/042386 filed on Nov. 13, 2020, which claims priority from Japanese Patent Application 2019-215426 filed on Nov. 28, 2019, the contents of all of which are incorporated herein by reference, in their entirety.

TECHNICAL FIELD

The present invention relates to a scanner apparatus, a hand scanner holder, and a hand scanner holding method.

BACKGROUND ART

FIG. 10 is a perspective view of a hand scanner 120 and a hand scanner holder 130 disclosed in Patent Literature 1. FIG. 11 is a perspective view showing a state in which a user grasps a grasping part 121 of the hand scanner 120 with one hand and is about to take out the hand scanner 120 from the hand scanner holder 130.

As shown in FIG. 10, for example, Patent Literature 1 discloses the scanner apparatus including the hand scanner 120, and the hand scanner holder 130 for holding the hand scanner 120. The hand scanner 120 disclosed in Patent Literature 1 includes the grasping part 121 which a user grasps with one hand, and a reading unit 122 that reads a barcode. The reading unit 122 includes a tapered left side part 122a and a tapered right side part 122b, the width of each of which becomes narrower the nearer it becomes to the grasping part 121.

In the scanner apparatus disclosed in Patent Literature 1, the hand scanner 120 is held in the hand scanner holder 130 in a state in which both-side parts 122a and 122b of the reading unit 122 abut against a pair of arms 132a and 132b, respectively, provided on the left and right sides of the front surface of a base part 131 of the hand scanner holder 130, and the grasping part 121 of the hand scanner 120 protrudes downward beyond the pair of arms 132a and 132b.

CITATION LIST

Patent Literature

Patent Literature 1: Japanese Unexamined Patent Application Publication No. 2016-71594

SUMMARY OF INVENTION

Technical Problem

As described above, in the scanner apparatus disclosed in Patent Literature 1, the grasping part 121 of the hand scanner 120 held by the hand scanner holder 130 is positioned below the pair of arms 132a and 132b. Therefore, as shown in FIG. 11, in the process that a user grasps the grasping part 121 of the hand scanner 120 with one hand and takes out the hand scanner 120 from the hand scanner holder 130 (e.g., takes out the grasping part 121 by pulling it upward), the hand or fingers with which the user is grasping the grasping part 121 of the hand scanner 120 could hit the hand scanner holder 130, thus causing a problem that it is difficult to smoothly takes out the hand scanner 120 from the hand scanner holder 130.

In view of the above-described problem, an object of the present invention is to provide a scanner apparatus, a hand scanner holder, and a hand scanner holding method capable of suppressing, in the process that a user takes out a hand scanner from the hand scanner holder, a hand and fingers with which the user is grasping a holding part of the hand scanner from hitting the hand scanner holder.

Solution to Problem

A scanner apparatus according to the present invention includes: a housing; a hand scanner including a grasping part, a reading unit disposed at one end of the grasping part in a state in which the reading unit is bent with respect to the grasping part in a side view, and a cable drawn from the other end of the grasping part; and a hand scanner holder attached to a side of the housing and configured to hold the hand scanner, in which the hand scanner holder includes a base part configured to be attached to the side of the housing, the base part includes a pair of holding pieces opposed to each other with a first interval therebetween, and the pair of holding pieces form a holding recess configured to hold a lower part of the grasping part of the hand scanner, which is inserted, from above the pair of the holding pieces, between the pair of holding pieces, in a state in which an upper part of the grasping part protrudes upward.

A hand scanner holder according to the present invention includes a base part attached to a side of a housing, in which the base part includes a pair of holding pieces opposed to each other with a first interval therebetween, and the pair of holding pieces form a holding recess configured to hold a lower part of a grasping part of the hand scanner, which is inserted, from above the pair of the holding pieces, between the pair of holding pieces, in a state in which an upper part of the grasping part protrudes upward.

A hand scanner holding method according to the present invention includes: a step of inserting, from above a holding recess, a lower part of a grasping part of a hand scanner into the holding recess, the holding recess being formed by a pair of holding pieces opposed to each other with a first interval therebetween; a step of holding the lower part of the grasping part inserted into the holding recess by the holding recess in a state in which an upper part of the grasping part protrudes upward from the holding recess; and a step of passing a cable drawn from a lower end of the lower part of the hand scanner through the first interval.

Advantageous Effects of Invention

According to the present invention, it is possible to provide a scanner apparatus, a hand scanner holder, and a hand scanner holding method capable of suppressing, in the process that a user takes out a hand scanner from the hand scanner holder, a hand and fingers with which the user is grasping a holding part of the hand scanner from hitting the hand scanner holder.

DESCRIPTION OF EMBODIMENTS

First Example Embodiment

Figure 1:
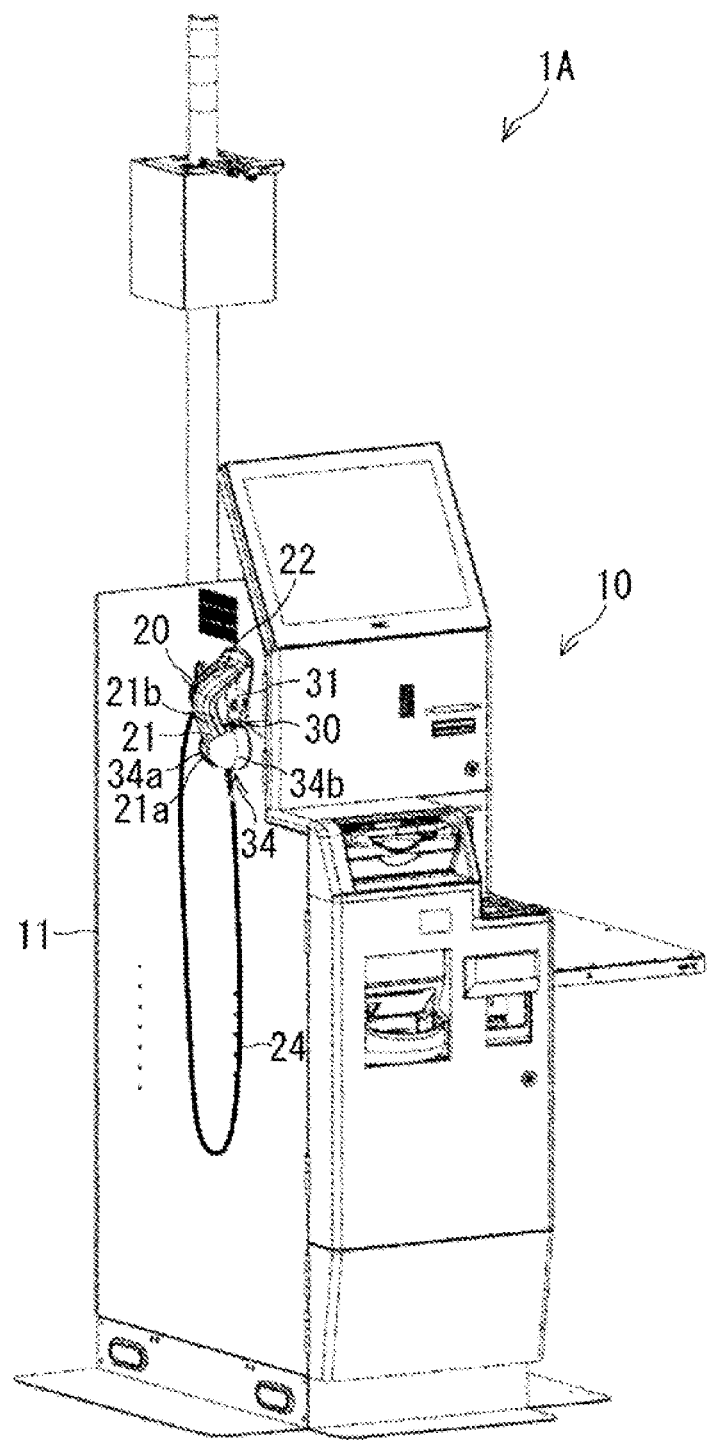
FIG. 1 is a perspective view of a scanner apparatus 1A according to a first example embodiment.

A scanner apparatus 1A, which is a first example embodiment according to the present invention, will be described hereinafter with reference to the accompanying drawings. The same reference numerals (or symbols) are assigned to corresponding components throughout the drawings, and redundant descriptions thereof are omitted.

Firstly, a configuration of the scanner apparatus 1A according to the first example embodiment will be described with reference to FIG. 1.

FIG. 1 is a perspective view of the scanner apparatus 1A according to the first example embodiment.

As shown in FIG. 1, the scanner apparatus 1A according to the first example embodiment includes a housing 11 of a semi-self-checkout apparatus 10, a hand scanner 20, and a hand scanner holder 30.

The hand scanner 20 includes a grasping part 21, a reading unit 22 disposed at one end (the upper end in FIG. 1) of the grasping part 21 in a state in which the reading unit 22 is bent with respect to the grasping part 21 in a side view, and a cable 24 extending to the outside from the other end (the lower end in FIG. 1) of the grasping part 21.

The hand scanner holder 30 is attached to a side of the housing 11 and holds the hand scanner 20.

The hand scanner holder 30 includes a base part 31 attached to the side of the housing 11. The base part 31 includes a pair of holding pieces 34a and 34b opposed to each other with a first interval therebetween.

The pair of holding pieces 34a and 34b form a holding recess 34 configured to hold a lower part 21a of the grasping part 21 of the hand scanner holder 30, which is inserted, from above the pair of the holding pieces 34a and 34b, between the pair of holding pieces 34a and 34b, in a state in which an upper part 21b of the grasping part 21 protrudes upward.

Figure 3:
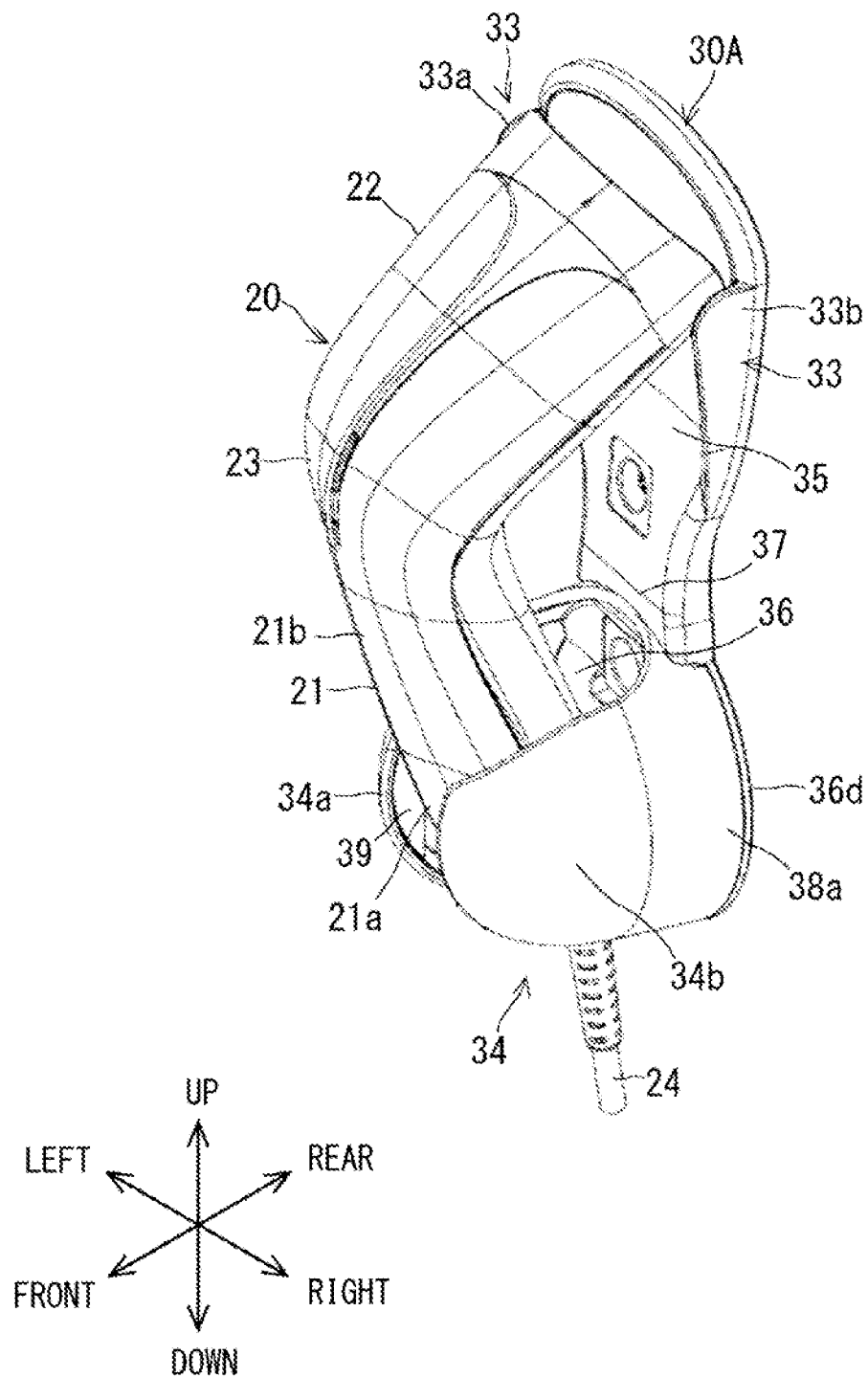
FIG. 3 is a perspective view of a hand scanner 20 held by a hand scanner holder 30A.

As described above, the hand scanner 20 is held in the hand scanner holder 30A (see FIG. 3). Specifically, the hand scanner 20 is held in the hand scanner holder 30 in a state in which the upper part 21b of the grasping part 21 of the hand scanner 20 protrudes upward from the holding recess 34 of the hand scanner holder 30, and the lower part 21a of the grasping part 21 is inserted into the holding recess 34 of the hand scanner holder 30.

A user can take out the hand scanner 20 from the hand scanner holder 30 by grasping the grasping part 21 (the upper part 21b) with one hand and pulling the hand scanner 20, which the user is grasping, upward.

At this time, the grasping part 21 (the upper part 21b) of the hand scanner 20 held by the hand scanner holder 30 (the holding recess 34) is positioned above the holding recess 34. Therefore, in the process of taking out the hand scanner 20 from the hand scanner holder 30, the hand finger gripping the grasping part 21 (the upper part 21b) of the hand scanner 20 can be suppressed from hitting the hand scanner holder 30.

As explained above, according to the first example embodiment, it is possible to provide a scanner apparatus, a hand scanner holder, and a hand scanner holding method capable of suppressing, in the process of taking out the hand scanner 20 from the hand scanner holder 30 (e.g., takes out the hand scanner 20 by pulling it upward), a hand and fingers with which the user is grasping the grasping part 21 (the upper part 21b) of the hand scanner 20 from hitting the hand scanner holder 30. As a result, the hand scanner 20 can be smoothly took out from the hand scanner holder 30.

Second Example Embodiment

A scanner apparatus 1B, which is a second example embodiment according to the present invention, will be described hereinafter with reference to the accompanying drawings. The same reference numerals (or symbols) are attached to corresponding components throughout the drawings, and redundant descriptions thereof are omitted. The scanner apparatus 1B according to the second example embodiment differs from the scanner apparatus 1A according to the first example embodiment in that the hand scanner holder 30 (the base part 31) further includes a guide part 33. The rest of the configuration of the scanner apparatus 1B is similar to that of the scanner apparatus 1A according to the first example embodiment. In the following description, the hand scanner holder according to the second example embodiment is referred to as a hand scanner holder 30A. For the rest of the configuration, the same reference numerals (or symbols) are assigned to components/structure similar to those in the first example embodiment.

Firstly, a configuration of the scanner apparatus 1B according to the second example embodiment will be described with reference to FIG. 2.

Figure 2:
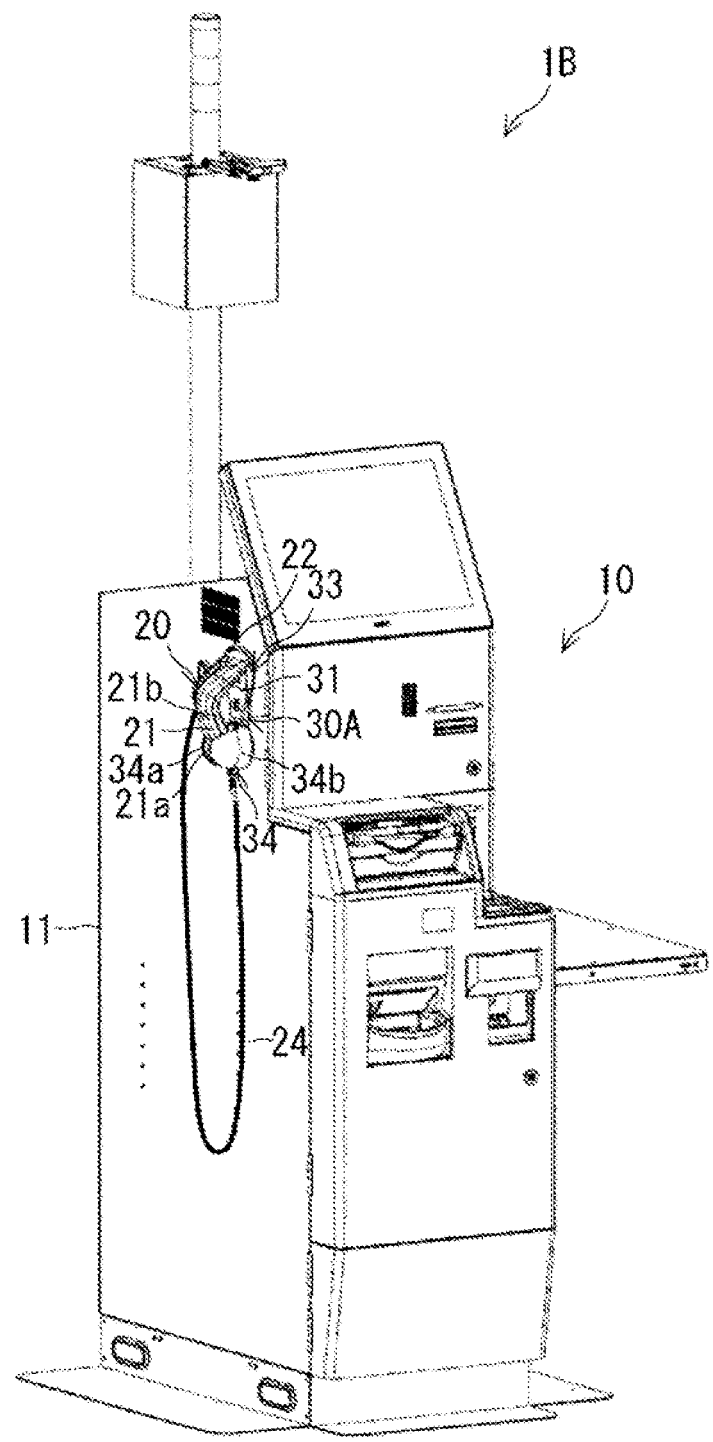
FIG. 2 is a perspective view of a scanner apparatus 1B according to a second example embodiment.

FIG. 2 is a perspective view of the scanner apparatus 1B according to the second example embodiment;

As shown in FIG. 2, the scanner apparatus 1B according to the second example embodiment includes a semi-self-checkout apparatus 10, a hand scanner 20 that a customer (a user) uses at the time of checking-out (i.e., at the time of payment), and a hand scanner holder 30A that holds the hand scanner 20.

The semi-self-checkout apparatus 10 is an apparatus by which a customer himself/herself pays for a commodity(ies)

he/she purchases with cash, electronic money, or the like, and includes a banknote handling apparatus, a coin handling apparatus, a card reader, and so on. The semi-self-checkout apparatus 10 includes a housing 11. A hand scanner holder 30A is attached to a side of the housing 11. Since the semi-self-checkout apparatus 10 is a well-known apparatus, further explanation thereof is omitted.

Next, a configuration of the hand scanner 20 will be described. The hand scanner 20 is used when, for example, a barcode on a membership card of a customer is read.

Figure 4A:
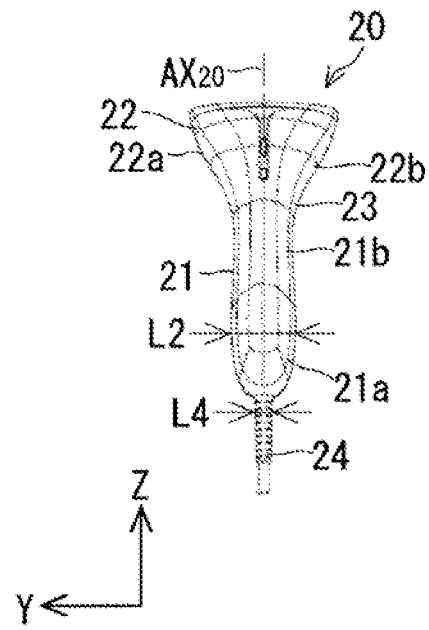
FIG. 4A is a rear view of the hand scanner 20.
Figure 4B:
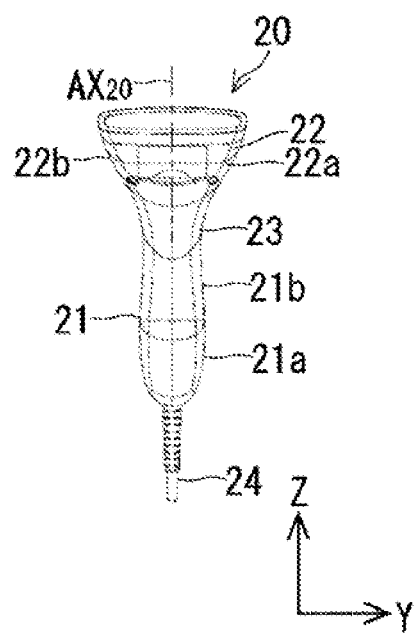
FIG. 4B is a front view of the hand scanner 20.
Figure 4C:
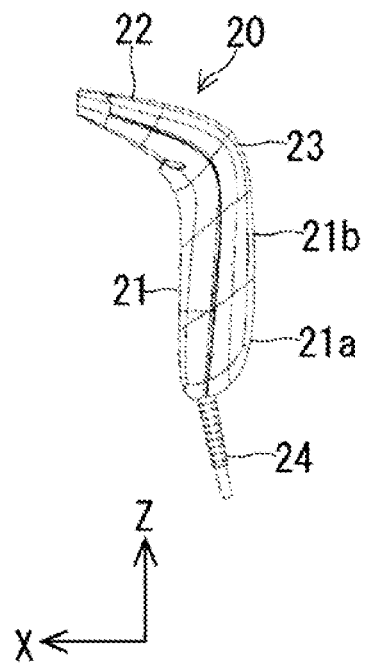
FIG. 4C is a left side view of the hand scanner 20.
Figure 4D:
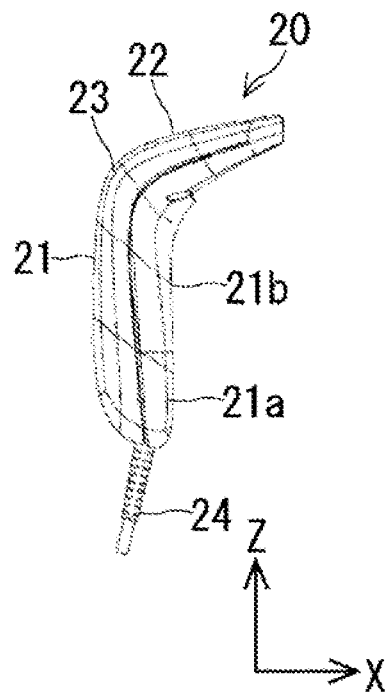
FIG. 4D is a right side view of the hand scanner 20.
Figure 4E:
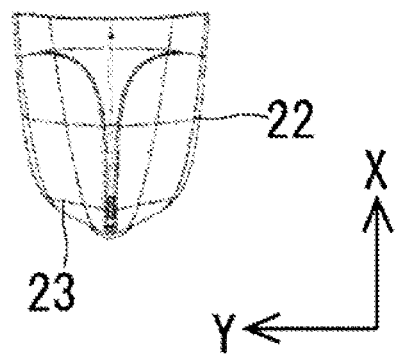
FIG. 4E is a plan view of the hand scanner 20.
Figure 4F:
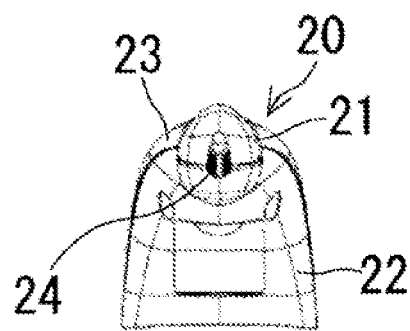
FIG. 4F is a bottom view of the hand scanner 20.

FIG. 3 is a perspective view of the hand scanner 20 held in the hand scanner holder 30A. FIGS. 4A to 4F are six views of the hand scanner 20. Specifically, FIG. 4A is a rear view of the hand scanner 20; FIG. 4B is a front view thereof; FIG. 4C is a left side view thereof; FIG. 4D is a right side view thereof; FIG. 4E is a plan view thereof; and FIG. 4F is a bottom view thereof.

In the following description, for the sake of explanation, directions "up", "down", "front", "rear", "right" and "left" are defined as shown in FIG. 3. The directions "up", "down", "front", "rear", "right" and "left" mean directions in regard to the posture of the hand scanner holder 30A attached to the side of the housing 11 of the semi-self-checkout apparatus 10, and in regard to the posture of the hand scanner 20 held in the hand scanner holder 30A attached to the side of the housing 11. Further, X-, Y- and Z-axes are defined as shown in FIGS. 4A to 4F, etc. The X- and Y-axes are orthogonal to each other on the same plane. The Z-axis extends in a direction orthogonal to the XY-plane. Specifically, the X-axis extends in the front/rear direction. The Y-axis extends in the left/right direction. The Z-axis extends in the up/down direction.

As shown in FIGS. 4A and 4B, the shape of the hand scanner 20 is axially symmetrical with respect to the center line $AX_{20}$ of the hand scanner 20.

As shown in FIG. 3 and FIGS. 4A to 4F, the hand scanner 20 includes a grasping part 21 that a user grasps with one hand, a reading unit 22 that reads a barcode, an intermediate part 23 (a bending part) between the grasping part 21 and the reading unit 22, and a cable 24.

As shown in FIGS. 4C and 4D, the hand scanner 20 has a dogleg shape in the side view. Specifically, the reading unit 22 is disposed at the upper end of the grasping part 21 in a state in which the reading unit 22 is bent (i.e., inclined) at an obtuse angle with respect to the grasping part 21 with the intermediate part 23 interposed therebetween in the side view.

As shown in FIG. 4a, the reading unit 22 includes tapered both-side parts (a left side part 22a and a right side part 22b), the width (the length in the Y-axis direction) of each of which becomes narrower the nearer it becomes to the grasping part 21 (the upper end). Specifically, each of the left and right side parts 22a and 22b of the reading unit 22 is inclined so that the width of the reading unit 22 becomes gradually narrower the nearer it becomes, from the upper end of the reading unit 22, to the lower end thereof.

The grasping part 21 is a rod-like part whose cross-sectional shape on the XY-plane is elliptical (see FIG. 8) and which extends in the Z-axis direction. In the following description, a part of the grasping part 21 that is inserted into the holding recess 34 of the hand scanner holder 30A is referred to as a lower part 21a, and a part of the grasping part 21 that protrudes upward from the holding recess 34 is referred to as an upper part 21b (see FIGS. 3 and 7A).

As shown in FIGS. 4A and 4B, in the rear view and the front view, the lower end (the lower surface) of the lower part 21a of the grasping part 21 has a U-shape that projects downward. On the other hand, as shown in FIGS. 4C and 4D, in a side view, the lower end (the lower surface) of the lower part 21a of the grasping part 21 is inclined rearward and obliquely upward and has a shape close to a U-shape projecting downward.

As shown in FIG. 4A etc., the cable 24 is drawn from the lower end (the lower surface) of the lower part 21a of the grasping part 21. The cable 24 is electrically connected to the reading unit 22 inside the hand scanner 20. Barcode information read by the hand scanner 20 (the reading unit 22) is sent to the semi-self-checkout apparatus 10 through the cable 24.

Next, a configuration of the hand scanner holder 30A will be described.

Figure 5:
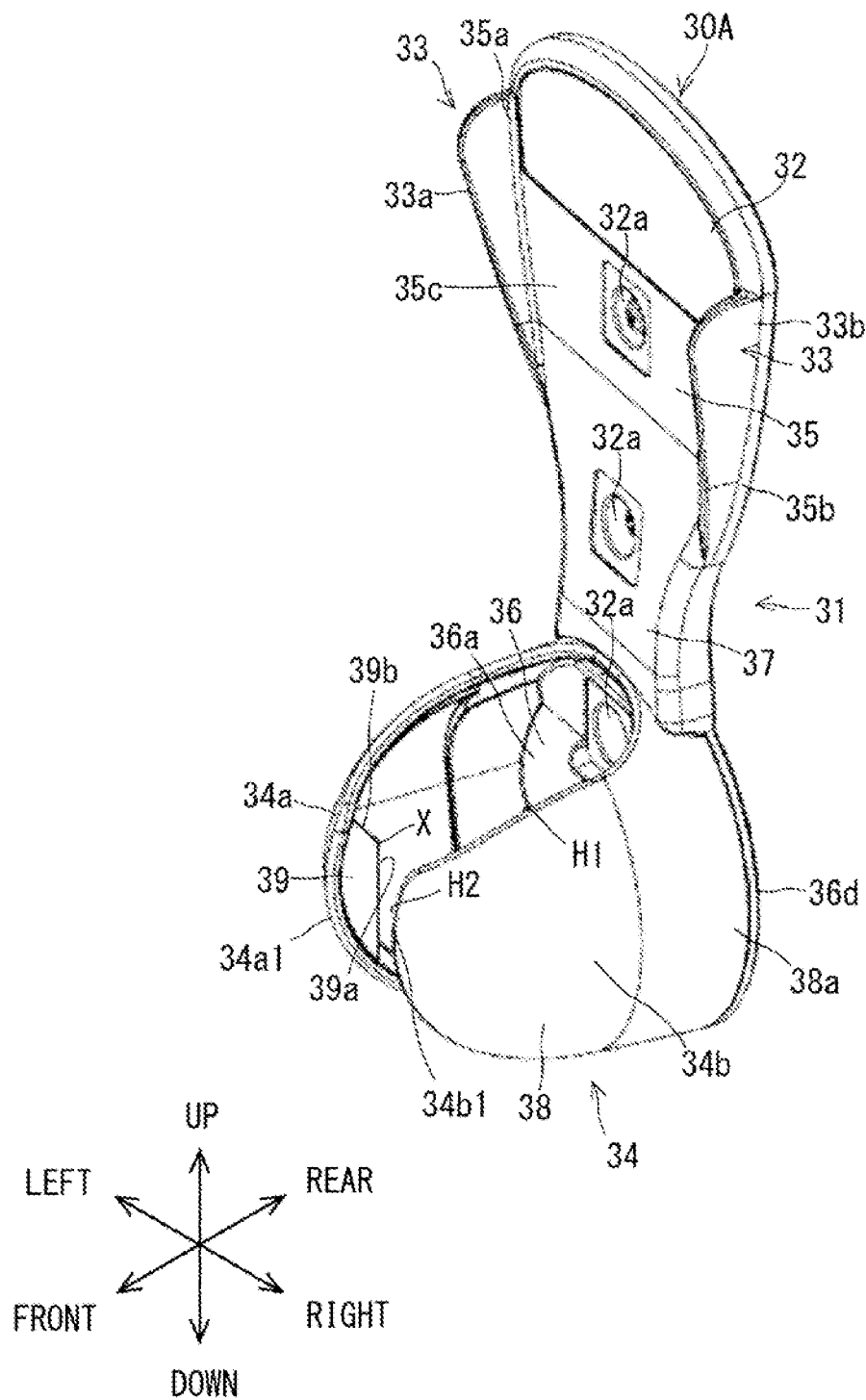
FIG. 5 is a perspective view of a hand scanner holder 30A.
Figure 6A:
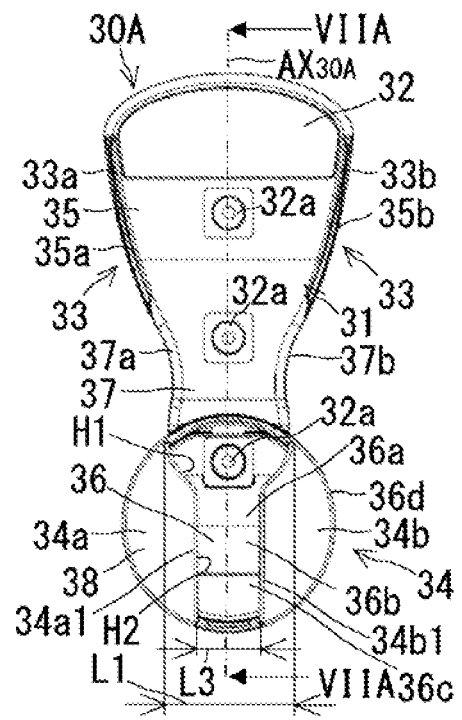
FIG. 6A is a front view of the hand scanner holder 30A.
Figure 6B:
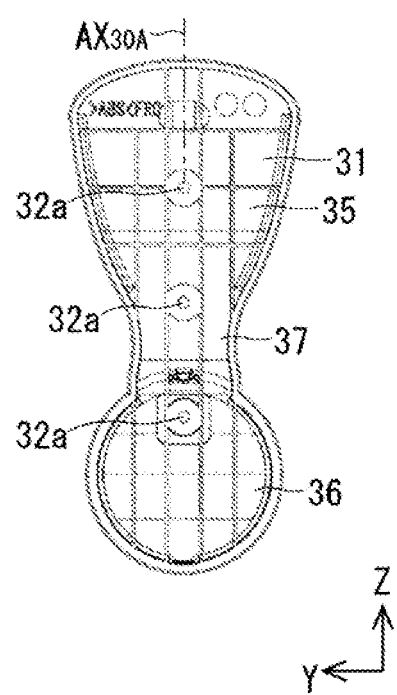
FIG. 6B is a rear view of the hand scanner holder 30A.
Figure 6C:
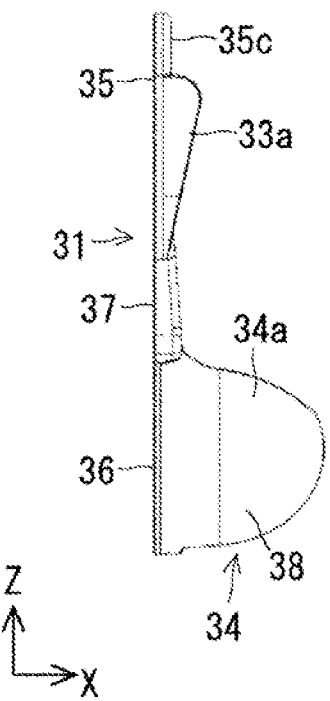
FIG. 6C is a left side view of the hand scanner holder 30A.
Figure 6D:
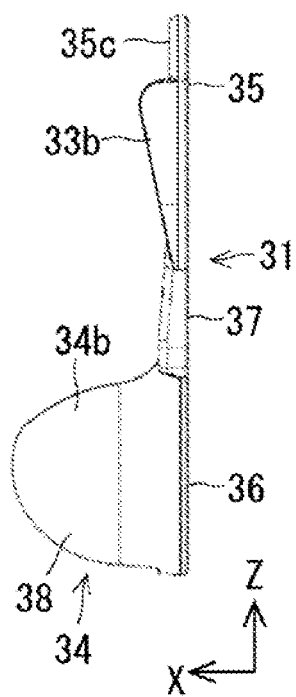
FIG. 6D is a right side view of the hand scanner holder 30A.
Figure 6E:
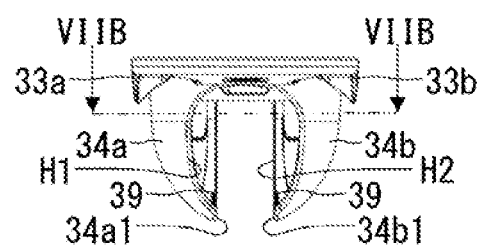
FIG. 6E is a plan view of the hand scanner holder 30A.
Figure 6F:
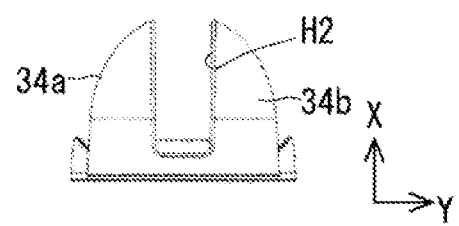
FIG. 6F is a bottom view of the hand scanner holder 30A.

FIG. 5 is a perspective view of the hand scanner holder 30A. FIGS. 6A to 6F are six views of the hand scanner holder 30A. Specifically, FIG. 6A is a front view of the hand scanner holder 30A; FIG. 6B is a rear view thereof; FIG. 6C is a left side view thereof; FIG. 6D is a right side view thereof; FIG. 6E is a plan view thereof; and FIG. 6F is a bottom view thereof.

As shown in FIGS. 6A and 6B, the shape of the hand scanner holder 30A is axially symmetrical with respect to the center line $AX_{30A}$ of the hand scanner holder 30A.

As shown in FIG. 5 and FIGS. 6A to 6F, the hand scanner holder 30A includes a base part 31. The base part 31 includes a base part main body 32, a guide part 33, and a holding recess 34.

The hand scanner holder 30A is attached to the side of the housing 11 of the semi-self-checkout apparatus 10 by screwing screws (not shown) inserted into screw holes 32a (at three places) formed in the base part main body 32 into the side of the housing 11 of the semi-self-checkout apparatus 10 (see FIG. 2). When doing so, the hand scanner holder 30A is attached to the housing 11 in such a posture that the guide part 33 is positioned on the upper side and the holding recess 34 is positioned on the lower side.

As shown in FIG. 5 and FIGS. 6A to 6F, the base part main body 32 includes a first plate-like part 35, which is a plate-like member, disposed on the upper side, a second plate-like part 36 disposed on the lower side, and a third plate-like part 37 disposed between the first and second plate-like parts 35 and 36.

Firstly, the first plate-like part 35 will be described.

As shown in FIG. 3, the reading unit 22 of the hand scanner 20 is opposed to the first plate-like part 35 in the state in which the hand scanner 20 is held in the hand scanner holder 30A.

As shown in FIG. 6A, the first plate-like part 35 includes both-side parts (a left side part 35a and a right side part 35b) having shapes similar to those of the both-side parts of the reading unit 22 of the hand scanner 20 (i.e., similar to those of the left and right side parts 22a and 22b shown in FIG. 4A). That is, the first plate-like part 35 includes tapered both-side parts (a left side part 35a and a right side part 35b), the width (the length in the Y-axis direction) of each of which becomes narrower the nearer it becomes to the third plate-like part 37 (the upper end). Specifically, each of the left and right side parts 35a and 35b of the first plate-like part 35 is inclined so that the width of the first plate-like part 35 becomes gradually narrower the nearer it becomes, from the upper end of the first plate-like part 35, to the lower end thereof.

As shown in FIGS. 5 and 6A, the first plate-like part 35 includes the guide part 33 that guides the hand scanner 20 (the reading unit 22). The guide part 33 includes a left guide piece 33a and a right guide piece 33b. The left and right guide pieces 33a and 33b are an example of a pair of guide pieces according to the present invention.

The left guide piece 33a is disposed in the left side part 35a of the first plate-like part 35. Similarly, the right guide piece 33b is disposed on the right side part 35b of the first plate-like part 35. Specifically, as shown in FIG. 6A, each of the left and right guide pieces 33a and 33b is inclined so that the interval (i.e., the distance) (corresponding to the second interval according to the present invention) between the left and right guide pieces 33a and 33b becomes gradually narrower the nearer it becomes, from the upper end of the first plate-like part 35, to the lower end thereof.

As shown in FIGS. 6C and 6D, each of the left and right guide pieces 33a and 33b protrudes from the front surface 35c of the first plate-like part 35 in the side view. The interval (i.e., the distance) between the left and right guide pieces 33a and 33b is wider than the interval (i.e., the distance) between the left and right side parts 22a and 22b of the reading unit 22.

As shown in FIG. 6E, the left guide piece 33a is slightly inclined in a front-left direction (in a lower-left direction in FIG. 6E). Similarly, the right guide piece 33b is slightly inclined in a front-right direction (in a lower-right direction in FIG. 6E). As a result, the hand scanner 20 (the reading unit 22) can be easily inserted between the left and right guide pieces 33a and 33b.

Next, the second plate-like part 36 will be described.

As shown in FIG. 3, the lower part 21a of the grasping part 21 of the hand scanner 20 is opposed to the second plate-like part 36 in the state in which the hand scanner 20 is held in the hand scanner holder 30A.

As shown in FIGS. 6A and 6B, the outer shape of the second plate-like part 36 is circular in the front view.

Figure 7A:
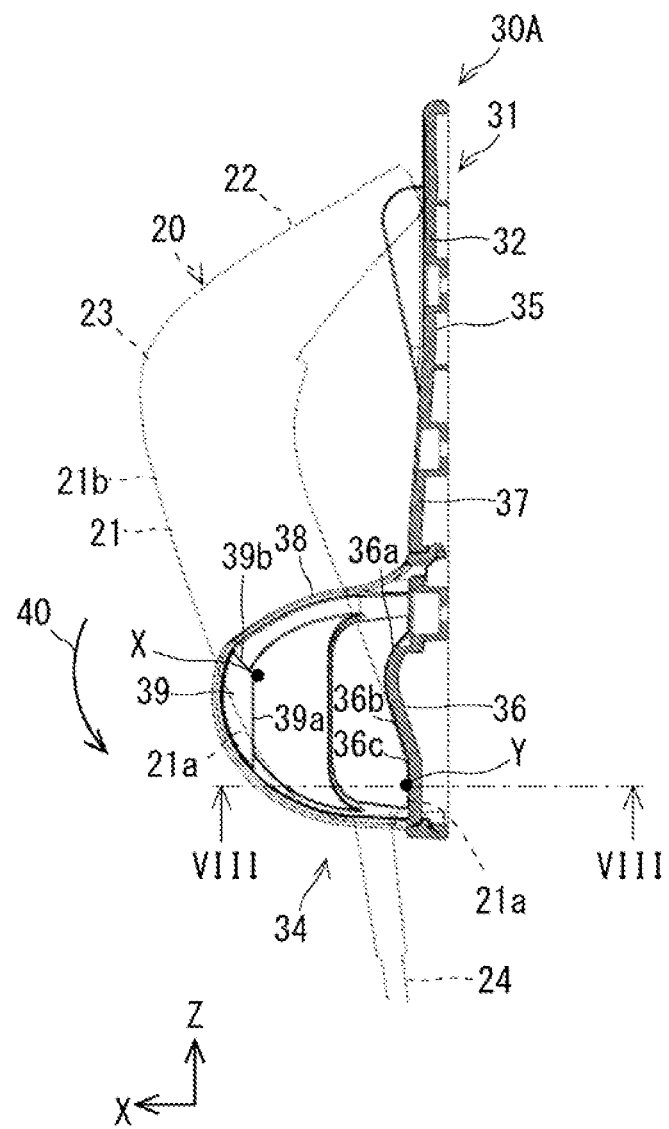
FIG. 7A is a cross-sectional view taken along a line VIIA-VIIA in FIG. 6A.
Figure 7B:
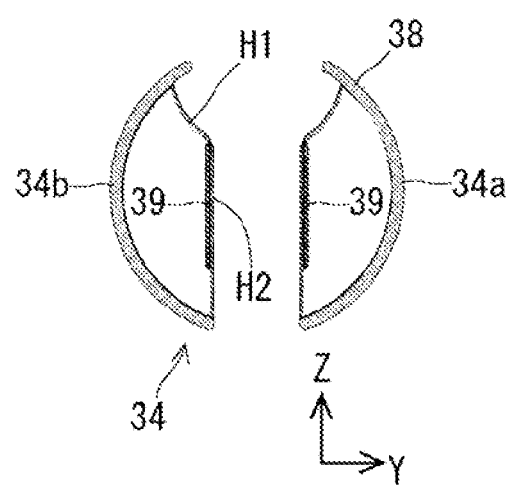
FIG. 7B is a cross-sectional view taken along a line VIIB-VIIB in FIG. 6E.
Figure 8:
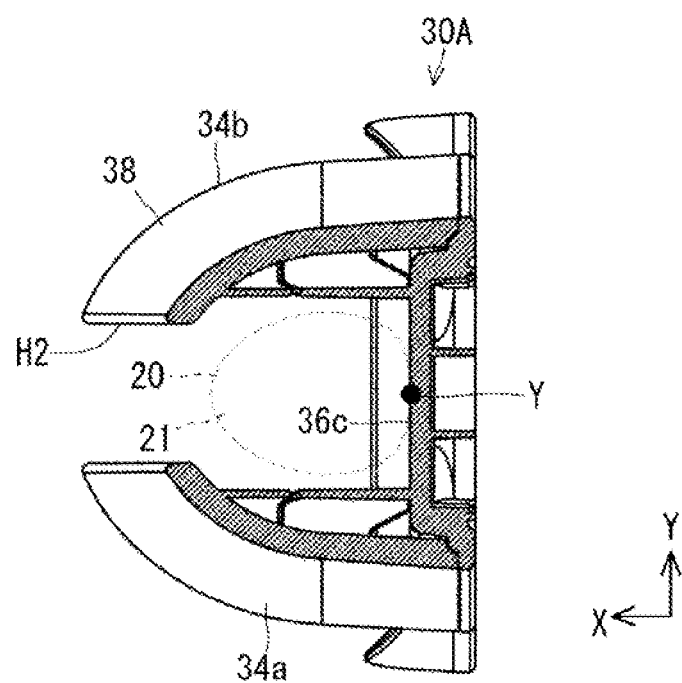
FIG. 8 is a cross-sectional view taken along a line VIII-VIII in FIG. 7A.

FIG. 7A is a cross-sectional view taken along a line VIIA-VIIA in FIG. 6A. Dotted lines in FIG. 7A indicate the outer shape of the hand scanner 20 in the state in which the hand scanner 20 is held in the hand scanner holder 30A. FIG. 7B is a cross-sectional view taken along a line VIIB-VIIB in FIG. 6E. FIG. 8 is a cross-sectional view taken along a line VIII-VIII in FIG. 7A.

As shown in FIG. 7A, the second plate-like part 36 includes a convex-curved surface part 36a that protrudes forward, a guide inclined-surface part 36b that is inclined in a lower-rear direction from the lower end of the convex-curved surface part 36a, and a flat-surface part 36c that extends downward from the lower end of the guide inclined-surface part 36b and is parallel to the YZ-plane.

As shown in FIGS. 5 to 8, the second plate-like part 36 includes a hollow hemispherical part 38 that projects forward. The second plate-like part 36 and the hemispherical part 38 constitute the holding recess 34. As shown in FIG. 5, an annular end 38a of the hemispherical part 38 is fixed to an outer peripheral part 36d of the second plate-like part 36. As shown in FIG. 7a, the lower part 21a of the grasping part 21 of the hand scanner 20 is inserted between the second plate-like part 36 and the hemispherical part 38.

The hemispherical part 38 does not have a perfect hemispherical shape, and instead is divided into a left holding piece 34a and a right holding piece 34b by a first through hole H1 and a second through hole H2 connected thereto. The left and right holding pieces 34a and 34b are an example of a pair of holding pieces according to the present invention. As shown in FIG. 6E, the first through hole H1, which is an elliptic through hole, is formed in the upper part of the hemispherical part 38. The grasping part 21 (the lower part 21a) of the hand scanner 20 is inserted into the first through hole H1. As shown in FIGS. 6a and 6F, the second through hole H2, which is a rectangular through hole, extends from the lower part of the hemispherical part 38 toward the first through hole H1 and is connected to the first through hole H1. In the second through hole H2, the cable 24 of the hand scanner 20 that has passed through the interval L3 between the left and right holding pieces 34a and 34b (see FIG. 6A) is disposed.

The length L1 of the first through hole H1 in the Y-axis direction (see FIG. 6A) is longer than the diameter L2 of the grasping part 21 (the lower part 21a) of the hand scanner 20 (see FIG. 4A). Therefore, the grasping part (the lower part 21a) of the hand scanner 20 can be inserted into the holding recess 34 through the first through hole H1.

In contrast, the length L3 of the second through hole H2 in the Y-axis direction (see FIG. 6A) is shorter than the diameter L2 of the grasping part 21 (the lower part 21a) of the hand scanner 20 (see FIG. 4A). Therefore, the grasping part (the lower part 21a) of the hand scanner 20 inserted into the holding recess 34 does not exit (i.e., does not come out of) the holding recess 34 through the second through hole H2. That is, even though the second through hole H2 is formed, the hand scanner 20 can be held in the hand scanner holder 30A in the state in which the lower part 21a of the grasping part 21 is inserted into the holding recess 34 of the hand scanner holder 30A.

Further, the length L3 of the second through hole H2 in the Y-axis direction (see FIG. 6A) is longer than the diameter L4 of the cable 24 of the hand scanner 20 (see FIG. 4A). Therefore, the cable 24 can freely pass through the interval L3 (corresponding to the first interval according to the present invention) between the left and right holding pieces 34a and 34b, and freely enter and exit from the second through hole H2.

As shown in FIGS. 5, 6E, 7A and 7B, each of the left and right holding pieces 34a and 34b includes a ribbed projection 39.

As shown in FIG. 6E etc., the ribbed projections 39 are disposed on the inner sides of a pair of end parts 34a1 and 34b1, respectively, which are parts of the left and right holding pieces 34a and 34b and are opposed to each other across the second through hole H2.

As shown in FIG. 7B, each of the ribbed projections 39 is a plate-like part having a thickness in the Y-axis direction. As shown in FIGS. 5 and 7A, each of the ribbed projections 39 includes a first edge part 39a extending in the Z-axis direction, a second edge part 39b that is inclined in an upper-front direction from the upper end of the first edge part 39a, and an intersection point X of the first and second edge parts 39a and 39b.

Next, the third plate-like part 37 will be described.

As shown in FIG. 3, the upper part 21b of the grasping part 21 of the hand scanner 20 is opposed to the third plate-like part 37 in the state in which the hand scanner 20 is held in the hand scanner holder 30A.

As shown in FIG. 6A, the third plate-like part 37 includes both-side parts (a left side part 37a and a right side part 37b) having shape similar to those of the both-side parts of the upper part 21b of the grasping part 21 of the hand scanner 20 (see FIG. 4A).

Next, an example of an operation of holding the hand scanner 20 by the hand scanner holder 30 A will be described.

In the process of holding the hand scanner 20 by the hand scanner holder 30A, for example, a customer brings the hand scanner 20, of which he/she is grasping the grasping part 21 with one hand, closer to the hand scanner holder 30A attached to the side of the housing 11 of the semi-selfcheckout apparatus 10. When doing so, the hand scanner 20 is in such a posture that the reading unit 22 is positioned on the upper side and the grasping part 21 is positioned on the lower side. Further, the reading unit 22 of the hand scanner 20 faces the hand scanner holder 30A. Then, the customer inserts, from above the holding recess 34 of the hand scanner holder 30A, the grasping part 21 (the lower part 21a) of the hand scanner 20, which is in the above-described posture, into the holding recess 34 through the first through hole H1. When doing so, the cable 24 of the hand scanner 20 passes through the interval L3 between the left and right holding pieces 34a and 34b (see FIG. 6A) and is placed inside the second through hole H2.

Further, when doing so, the reading unit 22 of the hand scanner 20 is inserted between the left and right guide pieces 33a and 33b provided in the hand scanner holder 30A, and the insertion direction of the hand scanner 20 (the reading unit 22) is guided by the left and right guide pieces 33a and 33b. Further, the grasping part 21 (the lower part 21a) of the hand scanner 20 is inserted between the second plate-like part 36 and the hemispherical part 38 (see FIG. 7A), and the insertion direction of the hand scanner 20 (the lower part 21a of the grasping part 21) is guided by the second plate-like part 36.

Next, the customer moves his/her hand, with which he/she has held the grasping part 21 of the hand scanner 20, off the grasping part 21.

As a result, the insertion direction of the hand scanner 20 is guided by the guide part 33 and the second plate-like part 36 by the weight of the hand scanner 20 and the cable 24 themselves, and the lower part 21a of the grasping part 21 abuts against (i.e., comes into contact with) the ribbed projections 39. In this process, the lower part 21a of the grasping part 21 comes into contact with the ribbed projections 39 at points X (at two points). Then, the hand scanner 20 attempts to rotate in the direction of the arrow 40 in FIG. 7A around the abutting points X.

However, this rotation is restricted as the flat-surface part 36c of the second plate-like part 36 abuts against (i.e., comes into contact with) the lower part 21a of the grasping part 21 of the hand scanner 20. In this process, the flat-surface part 36c of the second plate-like part 36 abuts against (i.e., comes into contact with) the lower part 21a of the grasping part 21 of the hand scanner 20 at a point Y.

As described above, the hand scanner 20 is held (i.e., put) in the hand scanner holder 30A (see FIG. 3). Specifically, the hand scanner 20 is held in the hand scanner holder 30A in the state in which the upper part 21b of the grasping part 21 of the hand scanner 20 protrudes upward from the holding recess 34 of the hand scanner holder 30A, and the lower part 21a of the grasping part 21 is inserted into the holding recess 34 of the hand scanner holder 30A. In this process, the hand scanner 20 is held in the state in which the three points (the points X (two points) and the point Y) of the hand scanner holder 30A abut against with the lower part 21a of the grasping part 21 (see FIG. 7A).

As a result, the hand scanner 20 is held in the hand scanner holder 30A in the state in which its movement is restricted in the front/rear direction (the X-axis direction), the lateral direction (the Y-axis direction), and the up/down direction (the Z-axis direction). In this state, since the hand scanner 20 is held in the state in which the reading unit 22 is inserted between the left and right guide pieces 33a and 33b provided in the hand scanner holder 30A, the movement of the hand scanner 20 is restricted in the lateral direction (the Y-axis direction).

Next, an example of actions through which the hand scanner 20, which is held in the hand scanner holder 30A as described above, is took out from the hand scanner holder 30A will be described.

Figure 9:
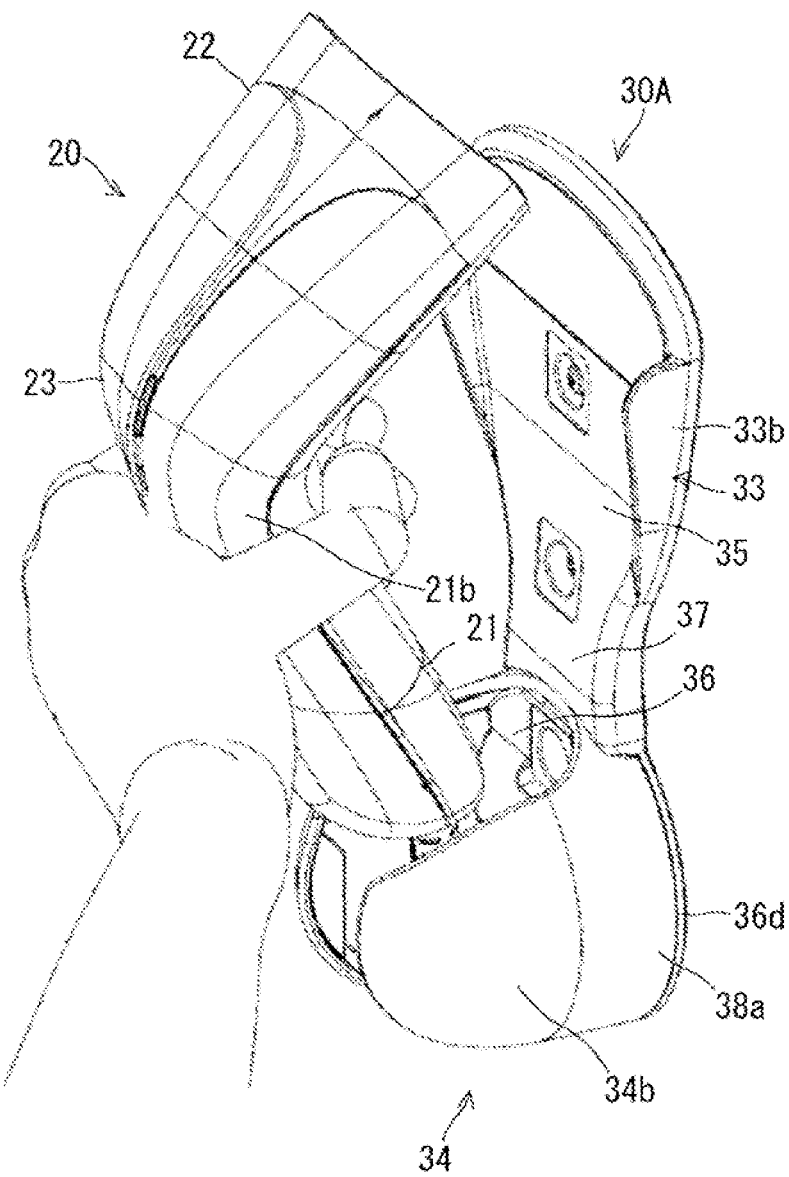
FIG. 9 shows a perspective view showing a state in which a user grasps a grasping part 21 of the hand scanner 20 with one hand and is about to take out the hand scanner 20 from a hand scanner holder 30A.
Figure 10:
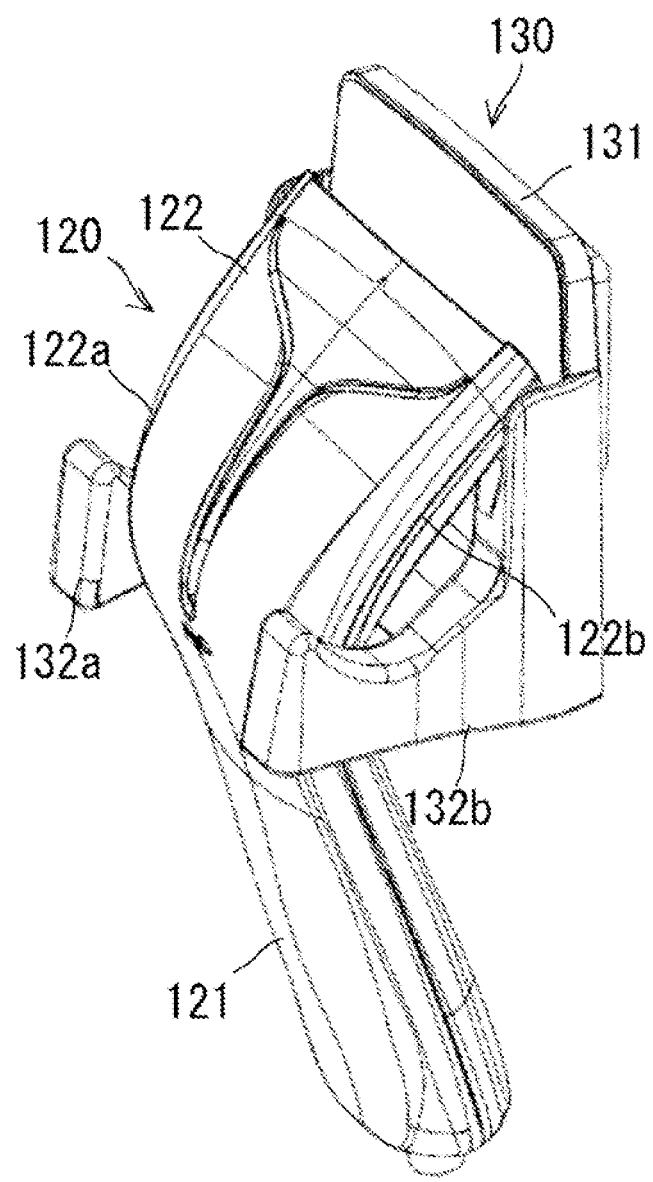
FIG. 10 is a perspective view of a hand scanner 120 and a hand scanner holder 130 disclosed in Patent Literature 1.
Figure 11:
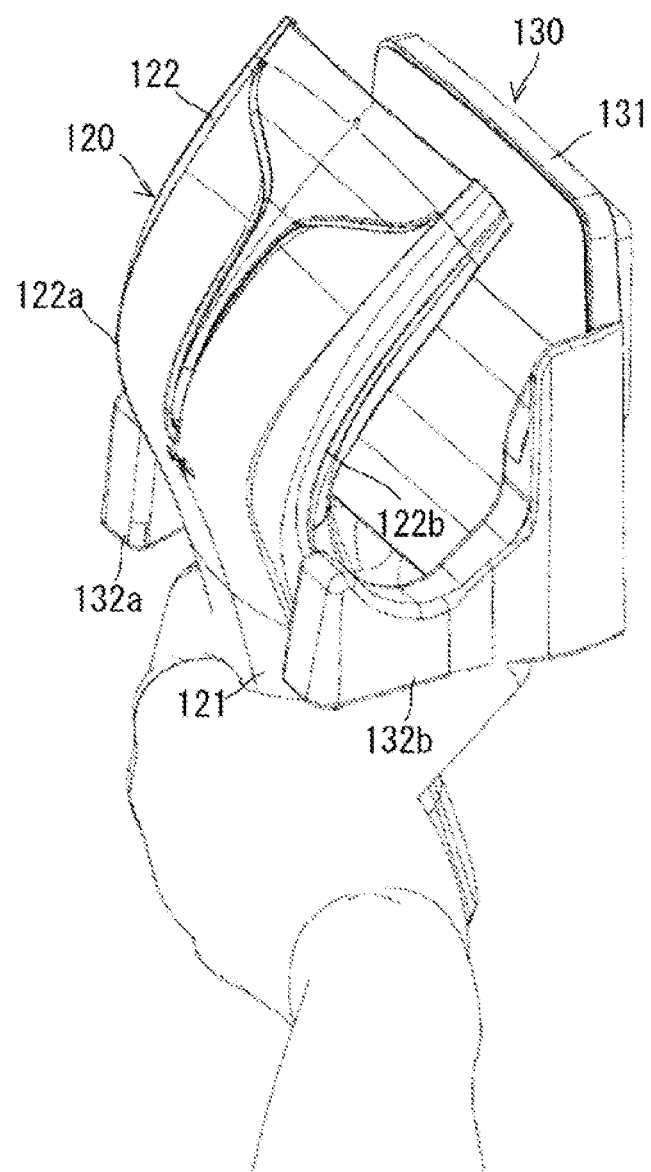
FIG. 11 is a perspective view showing a state in which a user grasps a grasping part 121 of the hand scanner 120 with one hand and is about to take out the hand scanner 120 from the hand scanner holder 130.

FIG. 9 shows a perspective view showing a state in which a user grasps the grasping part 21 of the hand scanner 20 with one hand and is about to take out the hand scanner 20 from the hand scanner holder 30A.

As shown in FIG. 9, the user can take out the hand scanner 20 from the hand scanner holder 30A by grasping the grasping part 21 (the upper part 21b) with one hand and pulling the hand scanner 20, which he/she is grasping, upward.

At this time, as shown in FIGS. 3 and 7A, the grasping part 21 (the upper part 21b) of the hand scanner 20 held by the hand scanner holder 30 (the holding recess 34) is positioned above the holding recess 34. Therefore, in the process of taking out the hand scanner 20 from the hand scanner holder 30, the hand finger gripping the grasping part 21 (the upper part 21b) of the hand scanner 20 can be suppressed from hitting the hand scanner holder 30.

As explained above, according to the second example embodiment, it is possible to provide a scanner apparatus, a hand scanner holder, and a hand scanner holding method capable of suppressing, in the process that a user takes out the hand scanner 20 from the hand scanner holder 30A (e.g., takes out the hand scanner 20 by pulling it upward), a hand and fingers with which the user is grasping the grasping part 21 (the upper part 21b) of the hand scanner 20 from hitting the hand scanner holder 30A.

Further, according to the second example embodiment, the guide part 33 is provided. Therefore, in the process of holding the hand scanner 20 by the hand scanner holder 30A, the insertion direction of the hand scanner 20 (the lower part 21a of the grasping part 21) to the hand scanner holder 30A (the holding recess 34) can be guided.

Next, a modified example will be described.

In the above-described second example embodiment, an example in which the hand scanner 20 is held in the state in which the three points (the points X (two points) of the ribbed projections 39 and the point Y of the flat-surface part 36c) of the hand scanner holder 30A (the holding recess 34) abut against the grasping part 21 (the lower part 21a) of the hand scanner 20 at (see FIG. 7A) was described. However, the configuration of the present invention is not limited to this example. For example, instead of the ribbed projection 39 and the flat-surface part 36c, a surface (e.g., a concave surface) that fits (i.e., conforms to) the outer peripheral surface of the grasping part 21 (the lower part 21a) of the hand scanner 20 may be provided in the hand scanner holder 30A, and the hand scanner 20 may be held in a state in which this surface is in contact (e.g., linear contact or surface contact) with the grasping part 21 (the lower part 21a) of the hand scanner 20. Note that a similar surface may be provided in the hand scanner holder 30 according to the first example embodiment.

Further, in each of the above-described example embodiments, an example in which the grasping part 21 (the rod-like part) whose cross-sectional shape on the XY-plane is elliptical (see FIG. 8) and which extends in the Z-axis direction is used as the grasping part of the hand scanner was described. However, the configuration of the present invention is not limited to this example. For example, a grasping part (a rod-like part) whose cross-sectional shape on the XY-plane is a triangular shape, a polygonal shape, or other shapes and which extends in the Z-axis direction may be used as the grasping part of the hand scanner. In such a case, the holding recess 34 (e.g., the first through hole H1) may have a shape corresponding to (i.e., conforming to) that of the grasping part 21 (i.e., the cross-sectional shape of the grasping part 21).

Further, in each of the above-described example embodiments, an example in which the housing 11 of the semi-self-checkout apparatus 10 is used as the housing was described. However, the configuration of the present invention is not limited to this example. For example, as the housing, a housing of other apparatuses (e.g., an information processing apparatus) equipped with a handheld scanner, such as a self POS apparatus with which a customer himself/herself registers a commodity(ies) he/she purchases and pays for the commodity(ies), may be used. Further, as the housing, a housing of other apparatuses (e.g., an information processing apparatus) equipped with a handheld scanner, such as a POS apparatus that is operated by a store clerk (a user), may be used.

All the numeral values mentioned in the above-described example embodiments are merely examples, and needless to say, numeral values different from them can be uses as desired.

The above-described example embodiments are merely examples in all the aspects thereof. The present invention should not be limited by the descriptions of the above-described example embodiments. The present invention may be carried out in various other forms without departing from the spirit or main features of the invention.

Although the present invention is described above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2019-215426, filed on Nov. 28, 2019, the disclosure of which is incorporated herein in its entirety by reference.

REFERENCE SIGNS LIST 1A, 1B SCANNER APPARATUS
10 SEMI-SELF-CHECKOUT APPARATUS
11 HOSING
20 HAND SCANNER
21 GRASPING PART
21a LOWER PART
21b UPPER PART
22 READING UNIT
22a LEFT SIDE PART
22b RIGHT SIDE PART
23 INTERMEDIATE PART
24 CABLE
30, 30A HAND SCANNER HOLDER
31 BASE UNIT
32 BASE PART MAIN BODY
32a SCREW HOLE
33 GUIDE UNIT
33a LEFT GUIDE PIECE
33b RIGHT GUIDE PIECE
34 HOLDING RECESS
34a HOLDING PIECE (LEFT HOLDING PIECE)
34a1 EDGE PART
34b RIGHT HOLDING PIECE
34b1 END PART
35 FIRST PLATE-LIKE PART
35a LEFT SIDE PART
35b RIGHT SIDE PART
35c FRONT SURFACE
36 SECOND PLATE-LIKE PART
36a CONVEX-CURVED SURFACE PART
36b GUIDE INCLINED-SURFACE PART
36c FLAT-SURFACE PART
36d OUTER PERIPHERAL PART
37 THIRD PLATE-LIKE PART
37a LEFT SIDE PART
37b RIGHT SIDE PART
38 HEMISPHERICAL PART
38a ANNULAR END PART
39 RIBBED PROJECTION
39a FIRST EDGE PART
39b SECOND EDGE PART
120 HAND SCANNER
121 GRASPING PART
122 READING UNIT
122a LEFT SIDE PART
122b RIGHT SIDE PART
130 HAND SCANNER HOLDER
131 BASE PART
132a ARM
132b ARM
H1 THROUGH HOLE
H2 THROUGH HOLE
L2 DIAMETER
L4 DIAMETER

What is claimed is:

1. A scanner apparatus comprising:
a housing;
a hand scanner comprising a grasping part, a reading unit disposed at one end of the grasping part in a state in which the reading unit is bent with respect to the grasping part in a side view, and a cable drawn from the other end of the grasping part; and
a hand scanner holder attached to a side of the housing and configured to hold the hand scanner, wherein
the hand scanner holder comprises a base part configured to be attached to the side of the housing,
the base part comprises a pair of holding pieces opposed to each other with a first interval therebetween, and
the pair of holding pieces form a holding recess configured to hold a lower part of the grasping part of the hand scanner, which is inserted, from above the pair of the holding pieces, between the pair of holding pieces, in a state in which an upper part of the grasping part protrudes upward, in which a ribbed projection provided respectively in a pair of the holding pieces abuts against the lower part of the grasping part, and in which a part of the holding recess abuts against the lower part of the gripping part of the hand scanner that attempts to rotate around the abutting point.

2. The scanner apparatus according to claim 1, wherein the base part further comprises a guide part,
the guide part is positioned on an upper side in a state in which the base part is attached to the side of the housing,
the holding recess is positioned on a lower side in the state in which the base part is attached to the side of the housing,
the guide part comprises a pair of guide pieces opposed to each other with a second interval therebetween, and
the second interval becomes gradually narrower the nearer it becomes, from an upper end of the base part, to the lower end thereof.

3. The scanner apparatus according to claim 2, wherein in the process of holding the hand scanner by the hand scanner holder, the guide part guides the reading unit and the holding recess holds the grasping part.

4. The scanner apparatus according to claim 2, wherein
the first interval is such an interval that the cable can pass therethrough, and
the second interval is an interval corresponding to a width of the reading unit in a lateral direction.

5. The scanner apparatus according to claim 2, wherein
the pair of holding pieces are symmetrical with respect to a center line of the first interval, and
the pair of guide pieces are symmetrical with respect to a center line of the second interval.

6. The scanner apparatus according to claim 1, wherein the holding recess has a shape corresponding to that of the grasping part of the hand scanner.

7. A hand scanner holder configured to be attached to a side of a housing and hold a hand scanner, the hand scanner holder comprising a base part configured to be attached to the side of the housing, wherein
the base part comprises a pair of holding pieces opposed to each other with a first interval therebetween, and
the pair of holding pieces form a holding recess configured to hold a lower part of a grasping part of the hand scanner, which is inserted, from above the pair of the holding pieces, between the pair of holding pieces, in a state in which an upper part of the grasping part protrudes upward, in which a ribbed projection provided respectively in a pair of the holding pieces abuts against the lower part of the grasping part, and in which a part of the holding recess abuts against the lower part of the gripping part of the hand scanner that attempts to rotate around the abutting point.

8. The hand scanner holder according to claim 7, wherein
the base part further comprises a guide part,
the guide part is positioned on an upper side in a state in which the base part is attached to the side of the housing,
the holding recess is positioned on a lower side in the state in which the base part is attached to the side of the housing,
the guide part comprises a pair of guide pieces opposed to each other with a second interval therebetween, and
the second interval becomes gradually narrower the nearer it becomes, from an upper end of the base part, to the lower end thereof.

9. A hand scanner holding method comprising:
a step of inserting, from above a holding recess, a lower part of a grasping part of a hand scanner into the holding recess, the holding recess being formed by a pair of holding pieces opposed to each other with a first interval therebetween; and
a step of holding the lower part of the grasping part inserted into the holding recess by the holding recess in a state in which an upper part of the grasping part protrudes upward from the holding recess, in which a ribbed projection provided respectively in a pair of the holding pieces abuts against the lower part of the grasping part, and in which a part of the holding recess abuts against the lower part of the gripping part of the hand scanner that attempts to rotate around the abutting point.

10. The hand scanner holding method according to claim 9, further comprising a step of passing a cable drawn from a lower end of the lower part of the hand scanner through the first interval.

* * * * *